(12) United States Patent
Huang

(10) Patent No.: US 7,375,659 B2
(45) Date of Patent: May 20, 2008

(54) MULTI-RATE NETWORK TRANSMISSION CIRCUIT

(75) Inventor: Chih-Wen Huang, Dashe Township, Kaohsiung County (TW)

(73) Assignee: Realtek Semiconductor Corp. (TW)

( * ) Notice: Subject to any disclaimer, the term of this patent is extended or adjusted under 35 U.S.C. 154(b) by 0 days.

(21) Appl. No.: 11/387,537

(22) Filed: Mar. 22, 2006

(65) Prior Publication Data
US 2006/0214826 A1 Sep. 28, 2006

(30) Foreign Application Priority Data
Mar. 25, 2005 (TW) ............... 94109217 A

(51) Int. Cl.
*H03M 7/00* (2006.01)
(52) U.S. Cl. ............. 341/61; 341/143; 341/144
(58) Field of Classification Search ......... 341/143, 341/120, 61, 155, 144, 118
See application file for complete search history.

(56) References Cited

U.S. PATENT DOCUMENTS

| 3,912,872 | A | * | 10/1975 | Callens ............ 370/428 |
| 5,386,438 | A | * | 1/1995 | England ............ 375/377 |
| 5,592,547 | A | * | 1/1997 | Wu et al. ........... 379/406.07 |
| 6,462,688 | B1 | | 10/2002 | Sutardja ............ 341/144 |
| 6,531,970 | B2 | * | 3/2003 | McLaughlin et al. ....... 341/61 |
| 6,988,161 | B2 | * | 1/2006 | McConnell et al. ....... 710/316 |
| 7,095,795 | B1 | * | 8/2006 | Agehari ............ 375/295 |

FOREIGN PATENT DOCUMENTS

EP   1187385   * 3/2002

* cited by examiner

*Primary Examiner*—Peguy JeanPierre

(57) ABSTRACT

A network transmitter and an associated transmitting method are disclosed. The network transmitter includes a signal converter and a signal driver. The former can convert an input signal into a current signal, and the latter can output a differential transmission signal according to the current signal. The signal driver includes a feedback network which can switch between a first configuration and a second configuration.

27 Claims, 9 Drawing Sheets

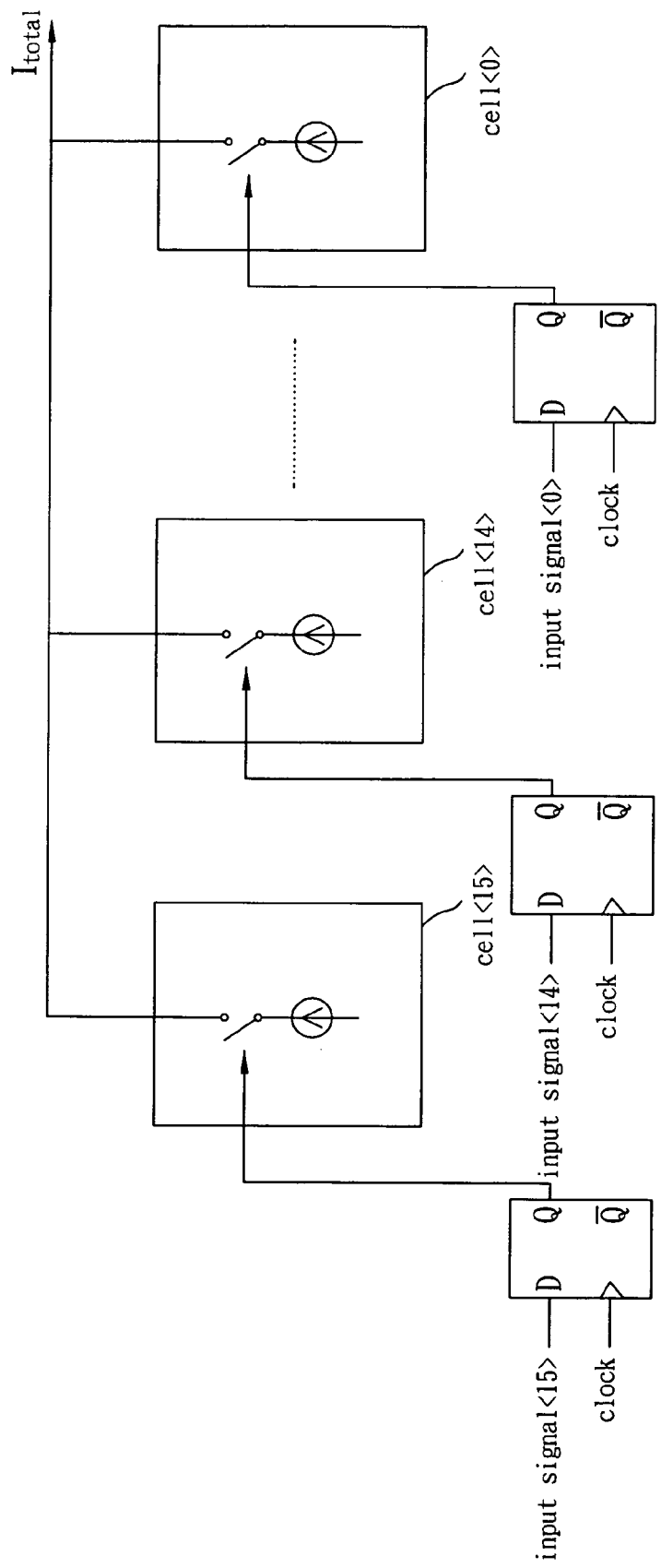
F I G. 3B

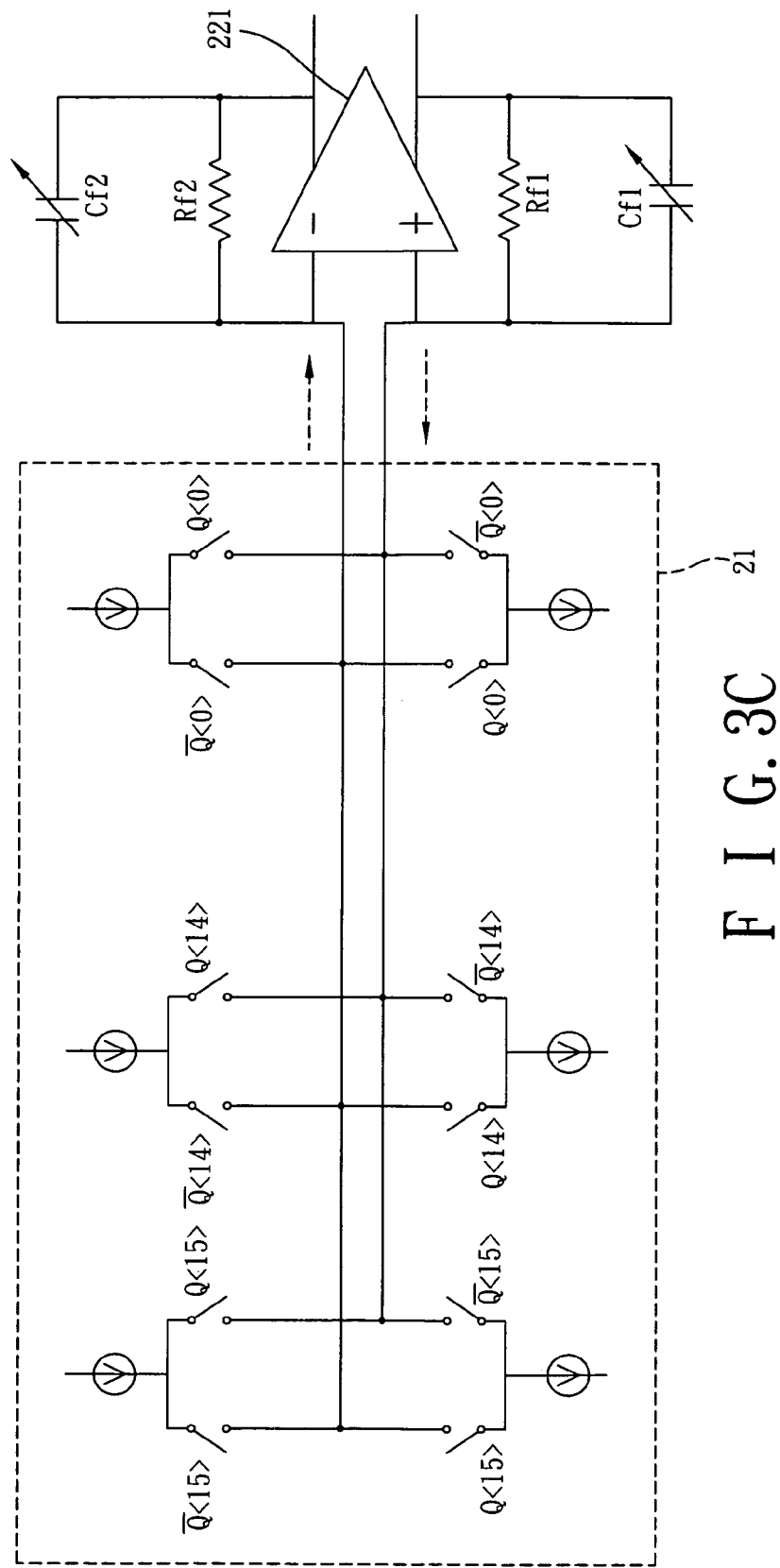
F I G. 3C

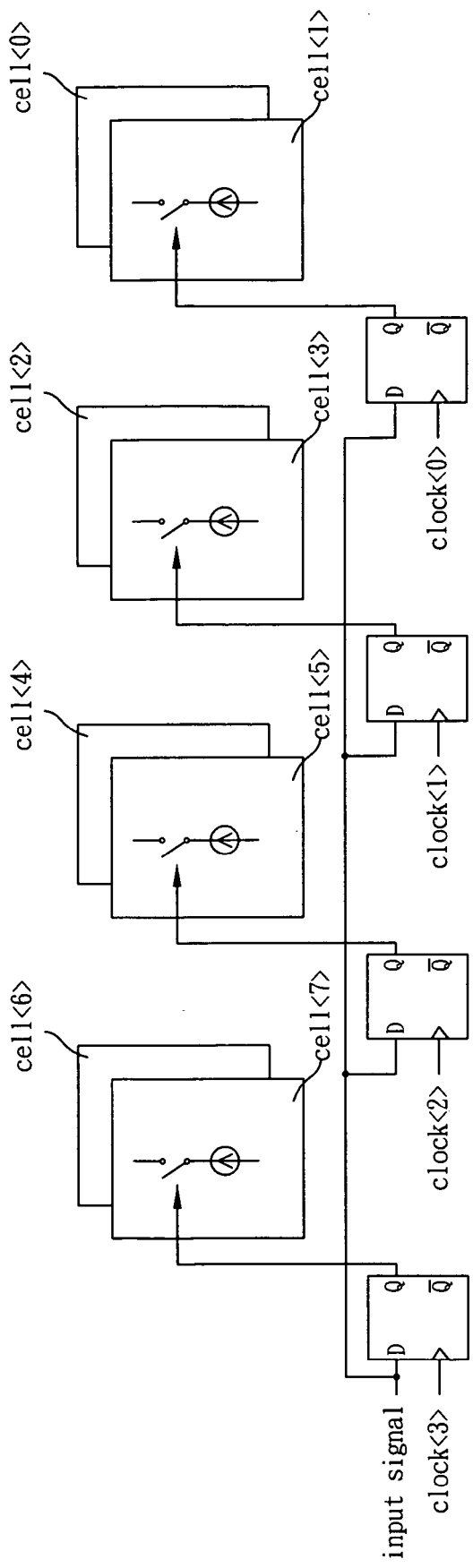
F I G. 4B

MULTI-RATE NETWORK TRANSMISSION CIRCUIT

BACKGROUND OF INVENTION

1. Field of the Invention

The present invention relates to network devices, and more particularly, to a transmitter of the network device and a method thereof.

2. Description of the Prior Art

Network technology is rapidly developed in recent years, and the demand for bandwidth is also growing increasingly. Along with this, the rate of network devices is upgraded from 10/100 Mbps to 1 Gbps. For example, each port of a 1 Gbps Ethernet device has four channels, each of which includes a transmitter and a receiver for transmitting and receiving differential transmission signals respectively, thereby communicating with other network devices.

FIG. 1 is a diagram of the transmitter of a conventional Ethernet device. As shown in FIG. 1, the transmitter 10 lies within an IC chip, and includes a voltage-controlled current source 11, a differential amplifier 12, and feedback resistors $R_{f1}$, $R_{f2}$.

To avoid the overshoot of the differential transmission signal, the voltage-controlled current source 11 performs slew rate control. That is, when the level of the differential transmission signal changes, the rise time (or fall time) is controlled to prevent the signal level from changing too fast. However, when the Ethernet device operates in 1 Gbps transmission rate, the voltage-controlled current source 11 is required to output a differential current with 17 levels, so as to match with 17 levels of the differential transmission signal defined in the related Ethernet specification. Thus, the circuit within the voltage-controlled current source 11 would be very difficult to design and would consume much more chip space.

SUMMARY OF INVENTION

It is therefore one objective of this invention to provide a network transmitting unit, thereby simplifying circuit design to save chip space and routing.

Another objective of this invention is to provide a network transmitting unit which can selectively perform slew rate control according to the transmission rate, thereby providing more flexible transmission.

According to one embodiment of this invention, a transmitter of a network device is provided. The transmitter outputs a transmission signal at a transmission rate, which is either a first transmission rate or a second transmission rate. The transmitter comprises: a signal converter configured to convert an input signal into a converted signal; and a signal driver, coupled to the signal converter, configured to output the transmission signal according to the converted signal. The signal driver configures to a first configuration when the transmitter outputs the transmission signal at the first transmission rate, and configures to a second configuration when the transmitter outputs the transmission signal at the second transmission rate.

According to another embodiment of this invention, a transmitter in a network device is provided. The transmitter outputs a transmission signal at a transmission rate, which is either a first transmission rate or a second transmission rate. The transmitter comprises: a signal converter which operates in a first mode or a second mode, and converts an input signal into a converted signal having a plurality of levels; and a signal driver, coupled to the signal converter, for outputting the transmission signal according to the converted signal. The signal converter operates in the first mode if the transmitter outputs the transmission signal in the first transmission rate, and operates in the first mode if the transmitter outputs the transmission signal in the second transmission rate.

According to another embodiment of this invention, a transmitting method used in a transmitter of a network device is provided. The method comprises: receiving an input signal; performing a level conversion on the input signal to output a first signal; determining whether to use a first characteristic or a second characteristic to convert the first signal into a transmission signal according to a transmission rate of the transmitter; and transmitting the transmission signal according to the transmission rate of the transmitter.

BRIEF DESCRIPTION OF THE DRAWINGS

The details of the present invention will be more readily understood from a detailed description of the preferred embodiments taken in conjunction with the following figures.

FIG. 3A to 3C are diagrams showing how the signal converter of FIG. 2 operates in the first mode.

FIGS. 4A and 4B are diagrams showing how the signal converter of FIG. 2 operates in the second mode.

DETAILED DESCRIPTION

Figure 2:
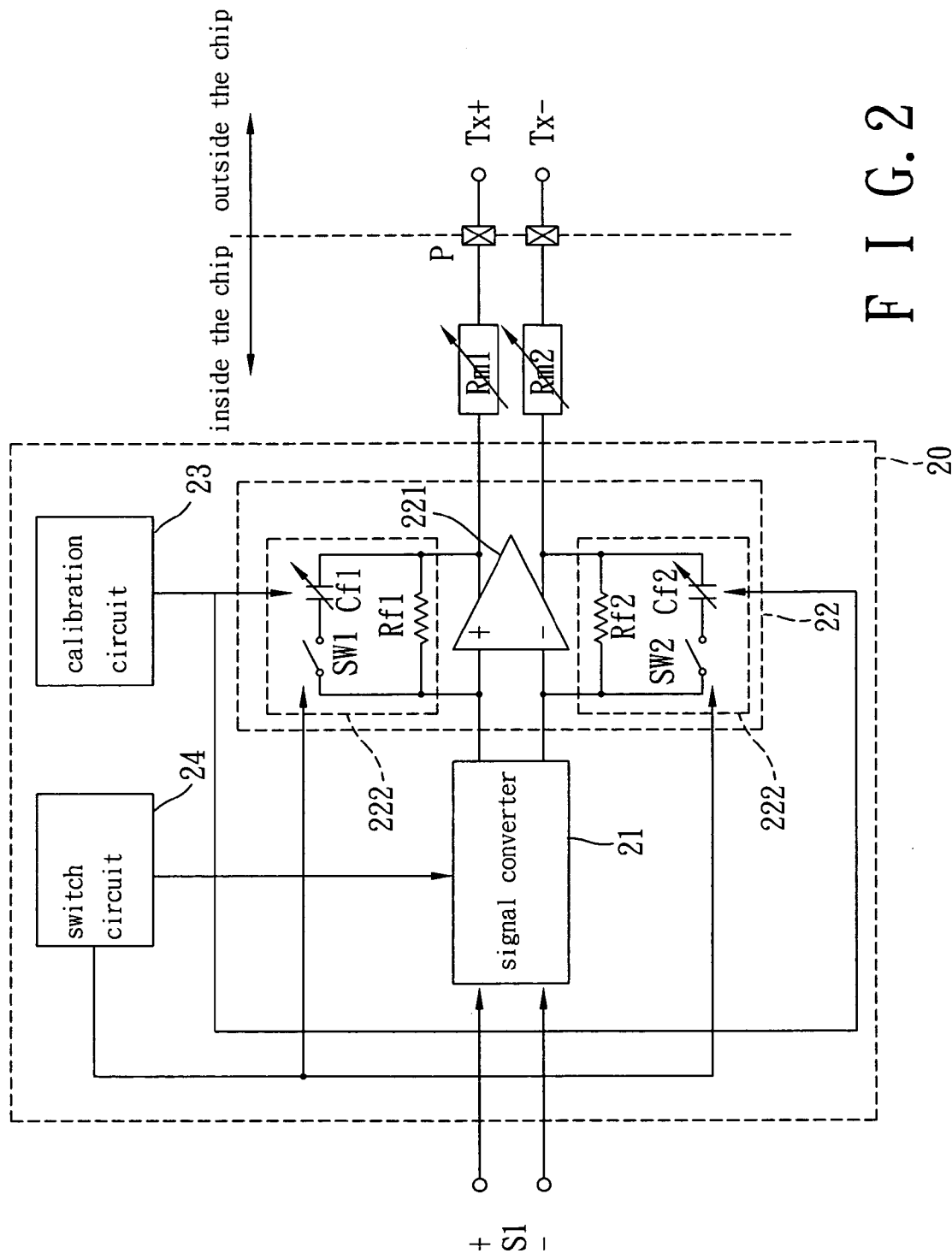
FIG. 2 is a diagram of the first embodiment of the network transmitter according to the present invention.

FIG. 2 is a diagram of the first embodiment of the network transmitter according to the present invention. The transmitter 20 in FIG. 2 is for transmitting differential transmission signals. As shown in FIG. 2, the transmitter 20 comprises a signal converter 21, a voltage-mode driver 22, a calibration circuit 23, and a switch circuit 24. The signal converter 21 converts an input signal S1 into a differential current signal, and the voltage-mode driver 22 outputs a differential transmission signal $T_{x+}$, $T_{x-}$, via the matching resistors $R_{m1}$, $R_{m2}$ and the pads P, according to the differential current signal. In a preferred embodiment, the values of the matching resistors $R_{m1}$, $R_{m2}$ are adjusted in accordance with outside circuits. In an embodiment, please refer to the U.S. patent application Ser. No. 10/978,628, filed Nov. 1, 2004, titled "Network transmitting unit with correction function", which has the same assignee with the present invention and is hereby incorporated by reference.

The signal converter 21 switches between a first mode and a second mode, and outputs a differential current signal having a plurality of levels. When the signal converter 21 operates in the first mode (i.e. the transmission rate is 1 Gbps), a direct level conversion is performed. That is, the differential current signal is directly changed from a level to a next level, without being changed to any intermediate level during the conversion.

On the other hand, when the signal converter 21 operates in the second mode (i.e. the transmission rate is 100 Mbps or 10 Mbps), an indirect level conversion is performed. That is, the differential current signal is changed to at least one intermediate level during the conversion from a level to a next level. The number and the change sequence of the intermediate level are determined according to a rise time (or fall time) of the differential current signal, thereby conforming to the related Ethernet specification.

Figure 3A:
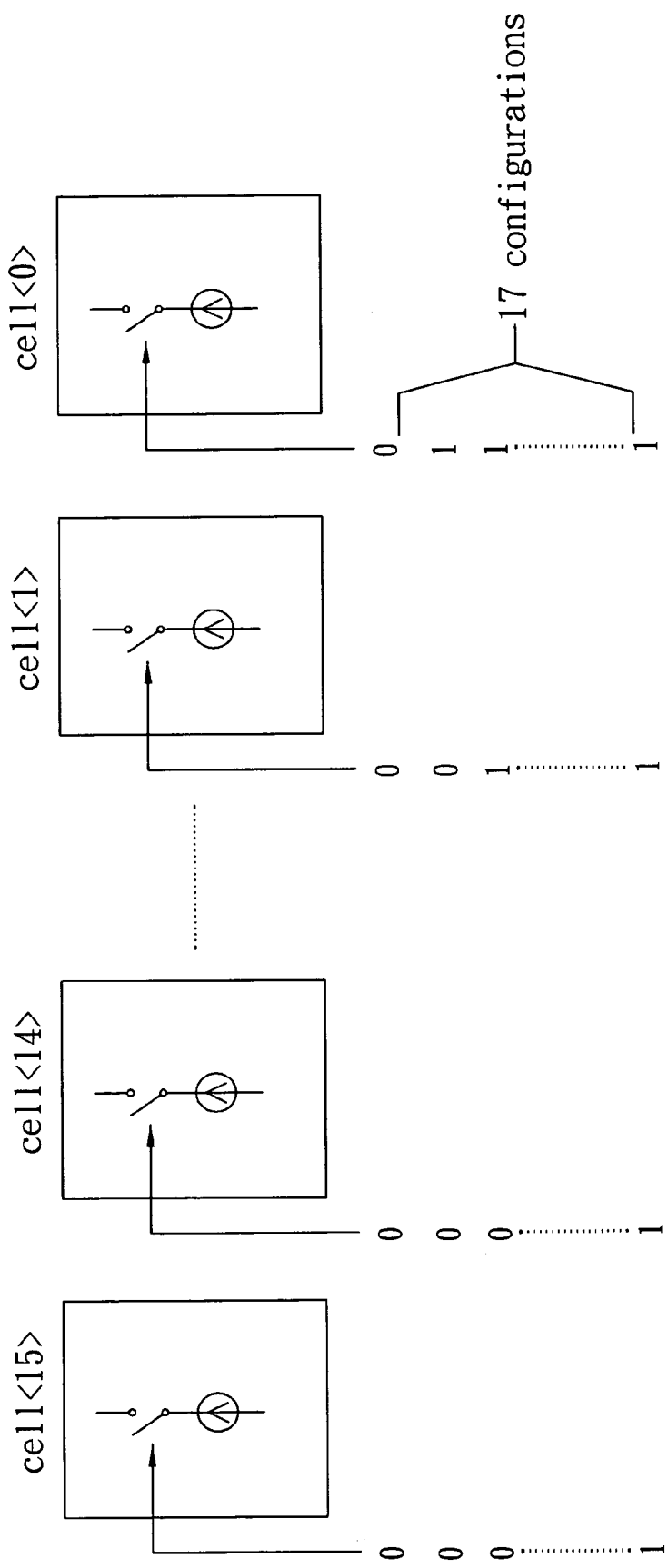

In one embodiment, the signal converter 21 is a digital-to-analog converter (DAC). In another embodiment, the signal converter 21 comprises a current cell module including a plurality of current cells, and each level of the outputted differential current signal is corresponding to a possible configuration of the current cells. The current cells can be implemented by switched current cells, each provides a substantially equal current and is connected or disconnected by a switch. In the first mode (i.e. direct level-converting mode), 16 current cells are used since the signal converter 21 is required to provide a differential current signal having 17 levels. FIGS. 3A and 3B are diagrams showing how the signal converter 21 operates in the first mode. In FIG. 3A, the 16 current cells provide 17 possible current cell configurations. A current signal with 17 levels can then be generated by calculating the total current for each of the 17 current cell configurations. In one embodiment, each current cell is coupled to a flip-flop, which generates a corresponding control signal according to the corresponding bit of a received input signal and a clock signal, as shown in FIG. 3B. FIG. 3C is a partial circuit diagram of the signal converter 21. In FIG. 3C, Q and $\overline{Q}$ (the inverse of Q) are the corresponding control signals outputted by the flip-flops in FIG. 3B. In sum, when the signal converter 21 operates in the first mode, the level of the outputted differential current signal changes once according to the input signal value during each clock period, without changing to any intermediate level. When the transmission rate is 1 Gbps, the signal converter 21 does not need to perform the slew rate control since the voltage-mode driver 22 uses a feedback network with a specific configuration, as described later.

Figure 1:
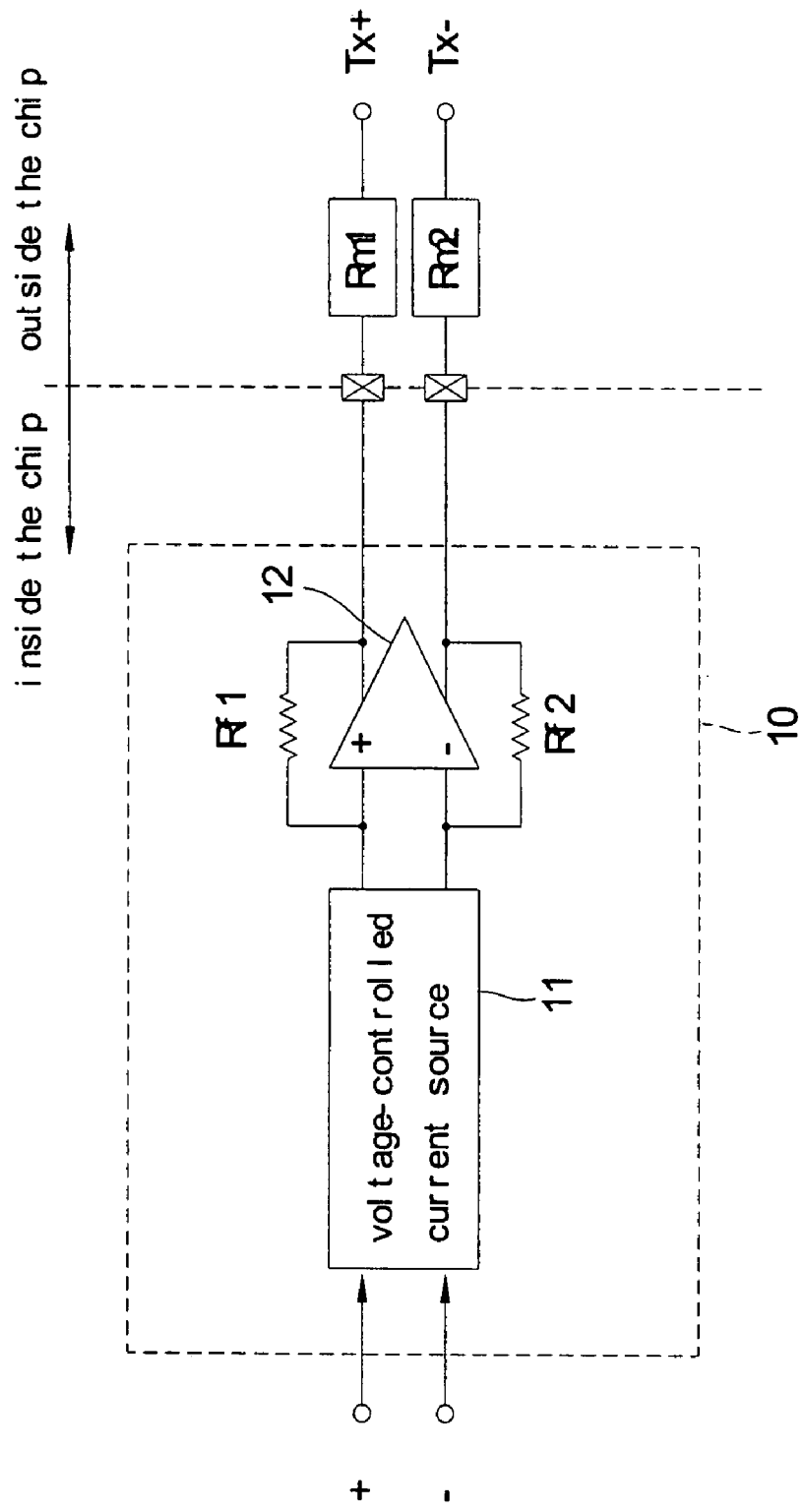
FIG. 1 is a diagram of the transmitter of a conventional Ethernet device.
Figure 4A:
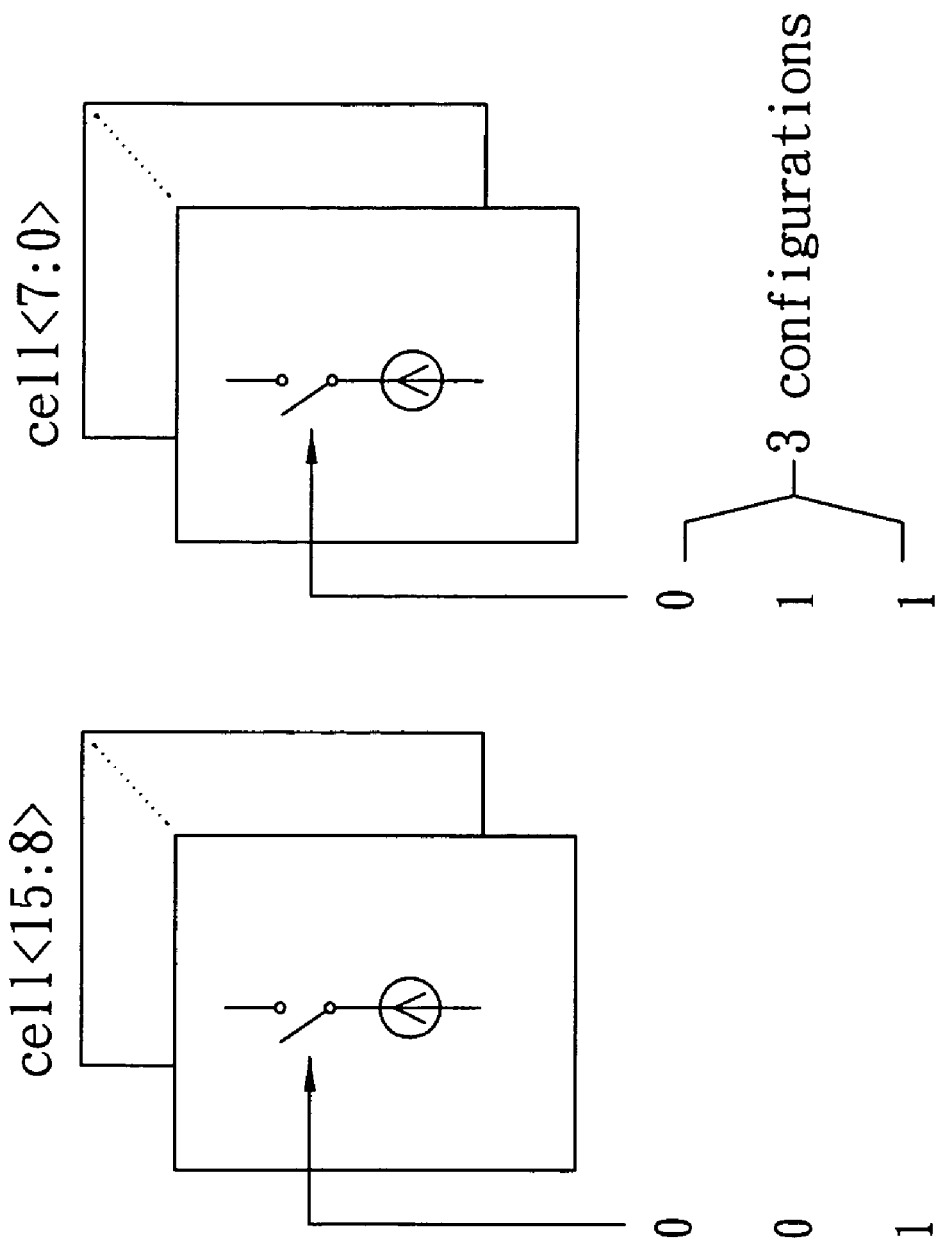

On the other hand, the 100 Mbps Ethernet specification requires a three-level differential transmission signal. Thus, the 16 current cells of the signal converter 21 are divided into two groups, each of which contains eight current cells, to provide three current cell configurations, as shown in FIG. 4A. In FIG. 4A, 1 and 0 represent that the corresponding group of current cells are all connected and disconnected, respectively. Since the signal converter 21 operates in the second mode (i.e. indirect level-converting mode) at 100 Mbps transmission rate, the current cells within each group become all connected or disconnected in a step-by-step manner. FIG. 4B shows that the current cells (cell <7:0>) within one group become all connected or disconnected in four steps. In FIG. 4B, four clock signals with various phases, denoted as clock <3> . . . clock <0>, are applied in turn to control the eight current cells (each clock signal for two cells). Another group of current cells (cell <15:8>) operates in the same manner synchronously. Thus, the differential current signal would be changed to three intermediate levels in turn during the conversion from a level to a next level. By adjusting the phase difference among the four clock signals, the time spent for the conversion can be controlled to conform to the related Ethernet specification.

The voltage-mode driver 22 receives the differential current signal from the signal converter 21, and outputs the differential transmission signal. As shown in FIG. 2, the voltage-mode driver 22 comprises a differential amplifier 221 and a feedback network 222. In the feedback network 222, $C_{f1}$ and $C_{f2}$ are adjustable capacitors adjusted by the calibration circuit 23 before the transmitter 20 starts transmission, as described later. The feedback network 222 also includes switches SW1 and SW2, coupled to the feedback capacitors $C_{f1}$ and $C_{f2}$ respectively.

The feedback network 222 switches between a first configuration and a second configuration, so as to provide two various transfer characteristics. The first configuration is a resistor-capacitor network (RC network). That is, the switches SW1 and SW2 are kept connected such that $C_{f1}$ and $C_{f2}$ are parallel connected with $R_{f1}$ and $R_{f2}$ respectively. The second configuration is a resistor network. That is, the switches SW1 and SW2 are kept disconnected such that $C_{f1}$ and $C_{f2}$ are also disconnected from the feedback network 222. When the transmitter 20 operates in 1 Gbps, the signal converter 21 switches to the first mode (direct level-converting mode) and the feedback network 222 switches to the first configuration (i.e. RC network). Since the charge/discharge characteristic of the feedback capacitors $C_{f1}$ and $C_{f2}$, the level of the differential transmission signal would change smoothly, not drastically (the degree of smoothness is determined by the RC time constant of the RC network). Thus, by adjusting the capacitor values of $C_{f1}$ and $C_{f2}$, the rise/fall time of the differential transmission signal can be controlled to meet the related specification.

On the other hand, when the transmitter 20 operates in 100 Mbps, the signal converter 21 switches to the second mode (indirect level-converting mode) and the feedback network 222 switches to the second configuration (i.e. resistor network). As mentioned earlier, by adjusting the phase difference among the clock signals used in the indirect level conversion, the time spent for the conversion from a level to a next level can be controlled to meet the related specification.

Figure 5:
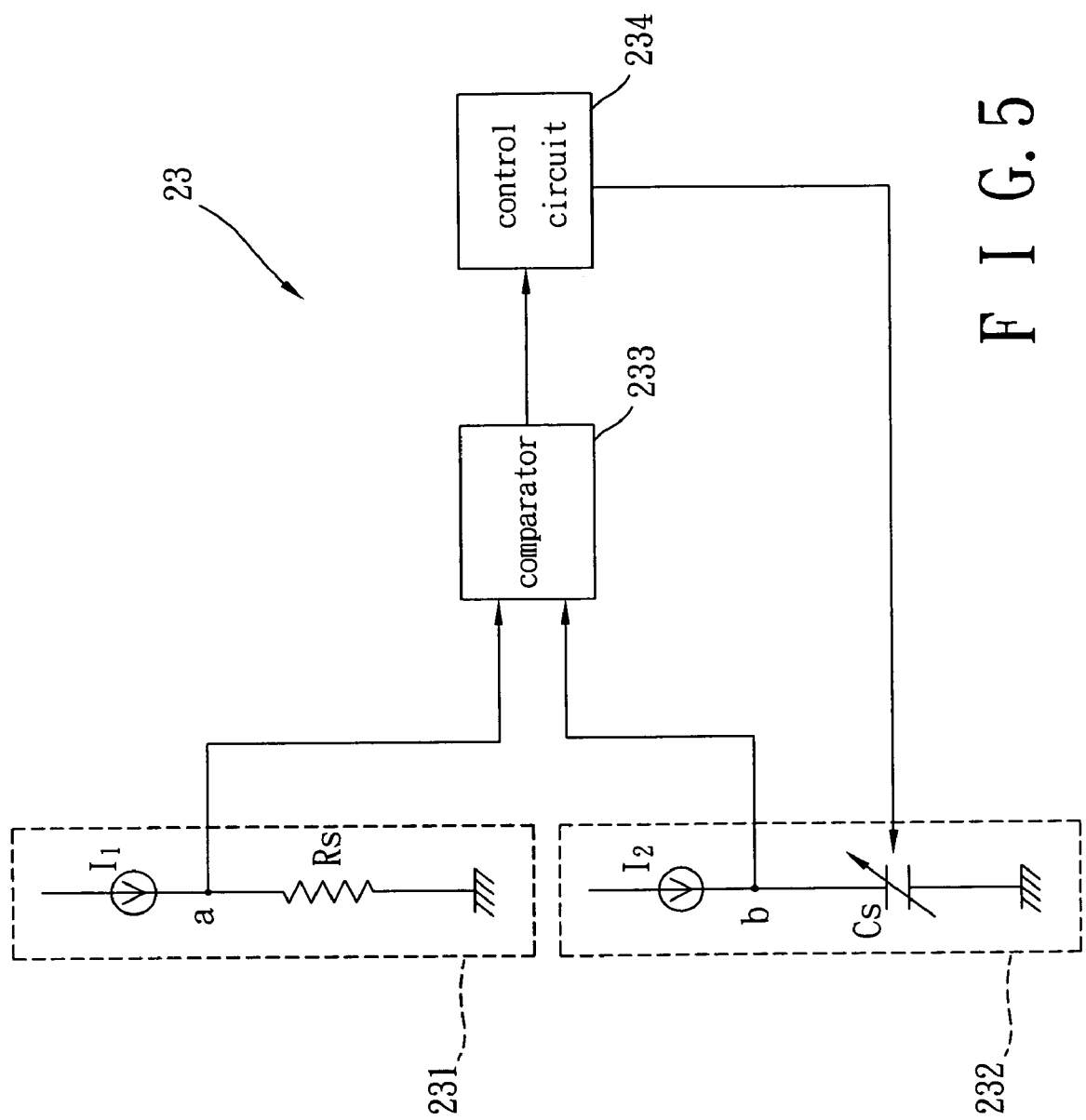
FIG. 5 is a block diagram of one embodiment of the calibration circuit of FIG. 2.

The calibration circuit 23 is coupled to the feedback network 222, and adjusts the RC time constant of the feedback network 222 before the transmitter 20 starts transmission. FIG. 5 is a block diagram of one embodiment of the calibration circuit 23. The calibration circuit 23 comprises: a first simulation circuit 231 for outputting a first simulation signal corresponding to the feedback resistor $R_{f1}$; a second simulation circuit 232 for outputting a second simulation signal corresponding to the feedback capacitor $C_{f1}$; a comparator 233 for outputting a comparison result according the first and second simulation signals; and a control circuit 234 for generating a calibration signal according to the comparison result. The calibration signal is provided to the feedback network 222 to adjust the RC time constant thereof.

In the embodiment of FIG. 5, the resistor $R_s$ is for simulating the values of the feedback resistors $R_{f1}$ and $R_{f2}$ of the feedback network 222, and the capacitor $C_s$ is for simulating the values of the feedback capacitors $C_{f1}$ and $C_{f2}$ of the feedback network 222. The first simulation signal is the voltage level at point a, i.e. $V_a = I_1 * R_s$; the second simulation signal is the voltage level at point b, i.e. $V_b = I_2/C_s * t$, wherein t is the time spent for the charging of the capacitor $C_s$. In order to generate a specification-conforming RC time constant, the capacitor $C_s$ needs to cause the voltage levels of the points a and b to be equal after being charged for a predetermined time T. That is, $$V_a = V_b \quad \text{Eq. (1-1)}$$

$$\Rightarrow I_1 * R_s I = I_2/C_s * T$$

$$\Rightarrow R_s * C_s = I_2/I_1 * T \quad \text{Eq. (1-2)}$$

If the comparison result of the comparator 233 shows that Eq. (1-1) is not met, the RC time constant needs an adjustment. For instance, if the result shows that $V_a$ is larger than $V_b$, it means the charging of $C_s$ is not fast enough. Thus, the capacitor value of $C_s$ should be decreased. The control circuit 234 adjusts the capacitor value of $C_s$ according to the comparison result (the control circuit 234 is also coupled to $C_{f1}$ and $C_{f2}$ in FIG. 5). When the capacitor value of $C_s$ is adjusted to meet Eq. (1-1), Eq. (1-2) represents the RC time constant required for the feedback network 222. It is also applicable to adjust $R_{f1}$ and $R_{f2}$ only, or adjust $R_{f1}$, $R_{f2}$, $C_{f1}$, and $C_{f2}$ in the meantime.

In FIG. 2, the switch circuit 24 is for controlling the feedback network 222 to switch between the first and second configurations, and controlling the signal converter 21 to switch between the first and second modes, according to the transmission rate of the transmitter 20.

Figure 6:
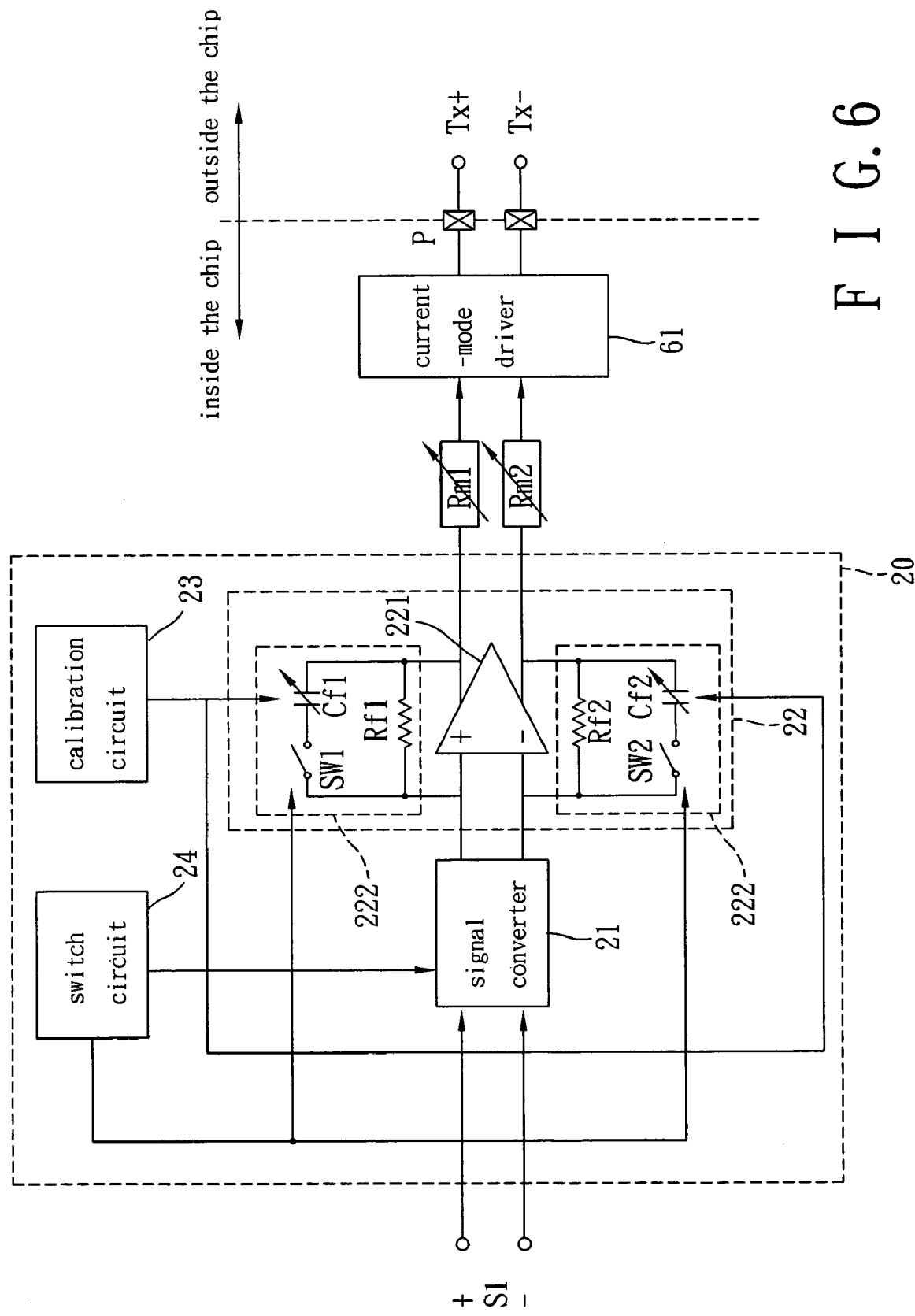
FIG. 6 is a diagram of the second embodiment of the network transmitter according to the present invention.

FIG. 6 is a diagram of the second embodiment of the transmitter according to the present invention. As shown in FIG. 6, the second embodiment is a combination of the first embodiment in FIG. 2 and a current-mode driver 61. As to the principle and operation of an embodiment of the current-mode driver 61, please refer to the U.S. patent application Ser. No. 10/909,811, filed Aug. 2, 2004, titled "Network device with hybrid-mode transmitter", which has the same assignee with the present invention and is hereby incorporated by reference.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A transmitter of a network device for outputting a transmission signal at a transmission rate, which is either a first transmission rate or a second transmission rate, the transmitter comprising:
a signal converter configured to convert an input signal into a converted signal;
a signal driver, coupled to the signal converter, configured to output the transmission signal according to the converted signal;
wherein the signal driver configures to a first configuration when the transmitter outputs the transmission signal at the first transmission rate, and the signal driver configures to a second configuration when the transmitter outputs the transmission signal at the second transmission rate; and
a calibration circuit, coupled to the signal driver, for adjusting a parameter of the first configuration.

2. The transmitter of claim 1, wherein the first configuration is a resistor-capacitor circuit, and the second configuration is a resistor circuit.

3. The transmitter of claim 1, wherein the signal converter comprises:
a current cell module having a plurality of possible configurations, wherein the current cell module comprises:
a plurality of current cells, coupled to an output end, each for receiving a corresponding control signal and outputting an output current according to the corresponding control signal.

4. The transmitter of claim 3, wherein when the signal driver configures to the first configuration, there is no phase difference between the corresponding control signals.

5. The transmitter of claim 3, wherein when the signal driver configures to the second configuration, there is a phase difference between the corresponding control signals.

6. The transmitter of claim 1 wherein the signal driver comprises:
an amplifier;
a first resistor coupled between an output terminal and an input terminal of the amplifier; and
a first capacitor and a first switch coupled between the output terminal and the input terminal of the amplifier, wherein the first switch is coupled to the first capacitor in series.

7. The transmitter of claim 6, wherein at least one of the first resistor and the first capacitor is adjustable.

8. The transmitter of claim 1, wherein the parameter of the first configuration comprises a RC time constant.

9. The transmitter of claim 1, further comprising:
a switch circuit for controlling the signal driver to switch between the first and second configurations and controlling the signal converter to switch between a direct converting mode and an indirect level-converting mode according to the transmission rate of the transmitter.

10. A transmitter in a network device for outputting a transmission signal at a transmission rate, which is either a first transmission rate or a second transmission rate, the transmitter comprising:
a signal converter which operates in a first mode or a second mode, and converts an input signal into a converted signal having a plurality of levels; and
a signal driver, coupled to the signal converter, for outputting the transmission signal according to the converted signal;
wherein the signal converter operates in the first mode if the transmitter outputs the transmission signal in the first transmission rate, and operates in the second mode if the transmitter outputs the transmission signal in the second transmission rate;
wherein the signal converter comprises a plurality of current cells, and each level of the converted signal is corresponding to a sum of the current cells.

11. The transmitter of claim 10, wherein the first mode is a direct level-converting mode and the second mode is an indirect level-converting mode.

12. The transmitter of claim 11, wherein if the signal converter operates in the indirect level-converting mode, the converted signal changes to at least an intermediate level during the conversion from a first level to a second level.

13. The transmitter of claim 12, wherein the number and the change sequence of the intermediate level are determined according to a rise time of the converted signal.

14. The transmitter of claim 11, wherein if the signal converter operates in the direct level-converting mode, the converted signal changes directly from a first level to a second level.

15. The transmitter of claim 10, wherein the signal driver operates in a first configuration when the transmitter outputs the transmission signal at the first transmission rate, the signal driver operates in a second configuration when the transmitter outputs the transmission signal at the second transmission rate.

16. The transmitter of claim 15, wherein the first configuration is a resistor-capacitor configuration, and the second configuration is a resistor configuration.

17. The transmitter of claim 15, further comprising:
a calibration circuit for outputting a calibration signal to the signal driver, wherein a parameter of the first configuration is adjusted according to the calibration signal.

18. A transmitting method used in a transmitter of a network device, the method comprising:
receiving an input signal;
determining to use a direct level conversion or an indirect level conversion to convert the input signal into a first signal according to a transmission rate of the transmitter;
determining to use a first characteristic or a second characteristic to convert the first signal into a transmission signal according to the transmission rate of the transmitter; and
transmitting the transmission signal according to the transmission rate of the transmitter.

19. The transmitting method of claim 18, wherein when the indirect level conversion is performed, the first signal changes to at least an intermediate level during the conversion from a first level to a second level.

20. The transmitting method of claim 19, wherein the number and the change sequence of the intermediate level are determined according to a rise time of the first signal.

21. The transmitting method of claim 18, wherein when the direct level conversion is performed, the first signal changes directly from a first level to a second level.

22. The transmitting method of claim 18, further comprising:
receiving a switch signal;
controlling a switch between the first and second characteristics according to the switch signal; and
controlling a switch between the direct and indirect level conversion according to the switch signal.

23. A transmitting method used in a transmitter of a network device, the method comprising:
receiving a calibration signal;
adjusting a first characteristic according to the calibration signal;
receiving an input signal;
performing a level conversion on the input signal to output a first signal;
determining whether to use the first characteristic or a second characteristic to convert the first signal into a transmission signal according to a transmission rate of the transmitter; and
transmitting the transmission signal according to the transmission rate of the transmitter.

24. The transmitter of claim 23, wherein the first signal is a differential signal.

25. A transmitter of a network device for outputting a transmission signal at a transmission rate, which is either a first transmission rate or a second transmission rate, the transmitter comprising:
a signal converter configured to convert an input signal into a converted signal; and
a signal driver, coupled to the signal converter, configured to output the transmission signal according to the converted signal;
wherein the signal driver configures to a first configuration when the transmitter outputs the transmission signal at the first transmission rate, and the signal driver configures to a second configuration when the transmitter outputs the transmission signal at the second transmission rate;
wherein the signal driver comprises:
an amplifier;
a first resistor coupled between an output terminal and an input terminal of the amplifier; and
a first capacitor and a first switch coupled between the output terminal and the input terminal of the amplifier, wherein the first switch is coupled to the first capacitor in series.

26. The transmitter of claim 25, wherein at least one of the first resistor and the first capacitor is adjustable.

27. The transmitter of claim 25, further comprising:
a calibration circuit, coupled to the signal driver, for adjusting a parameter of the first configuration.

* * * * *